United States Patent [19]
Gandhi et al.

[11] Patent Number: 5,737,451
[45] Date of Patent: Apr. 7, 1998

[54] METHOD AND APPARATUS FOR SUPPRESSING BLOCKING ARTIFACTS IN BLOCK-TRANSFORM CODED IMAGES

[75] Inventors: Bhavan R. Gandhi; Majid Rabbani, both of Pittsford; Rodney L. Miller, Fairport, all of N.Y.

[73] Assignee: Eastman Kodak Company, Rochester, N.Y.

[21] Appl. No.: 630,553

[22] Filed: Apr. 10, 1996

[51] Int. Cl.$^6$ .............................. G06T 5/00; G06T 9/00; H04N 1/409; H04N 1/415
[52] U.S. Cl. ..................... 382/268; 382/239; 382/250; 382/261; 382/264; 358/433; 358/430
[58] Field of Search ........................... 382/268, 239, 382/250, 266, 254, 261, 264; 358/433, 430, 261.3, 432; 348/420, 404, 403

[56] References Cited

U.S. PATENT DOCUMENTS

| | | |
|---|---|---|
| 5,495,538 | 2/1996 | Fan .......................... 382/268 |
| 5,590,064 | 12/1996 | Astle ......................... 382/268 |

FOREIGN PATENT DOCUMENTS

| | | |
|---|---|---|
| 0 363 418 B1 | 10/1993 | European Pat. Off. . |
| 0 585 573 A2 | 3/1994 | European Pat. Off. . |

OTHER PUBLICATIONS

W.B. Pennebaker, J.L. Mitchell, JPEG, Still Image Data Compression Standard, 1993, pp. 261–265.

*Primary Examiner*—Scott A. Rogers
*Attorney, Agent, or Firm*—Peyton C. Watkins

[57] ABSTRACT

An improved method for removing blocking artifacts in regions of slowly varying intensity in an electronic image decoded from a transform coded representation of an image, includes the steps of: receiving signals indicative of DC and AC coefficient values of transformed blocks of image data; modifying the DC value in each of the blocks based on the level of activity within the block and the DC values in neighboring blocks; performing AC prediction in each block using the modified DC values; replacing the AC values in each block with the AC predicted values based on the level of activity within the block and the modified DC values in neighboring blocks; and reconstructing the image using the modified DC and AC coefficient values.

32 Claims, 4 Drawing Sheets

METHOD AND APPARATUS FOR SUPPRESSING BLOCKING ARTIFACTS IN BLOCK-TRANSFORM CODED IMAGES

FIELD OF INVENTION

The invention relates generally to the field of image processing and, more particularly, to removing artifacts resulting from block-transform coded images.

BACKGROUND OF THE INVENTION

Various numerically lossy compression methods are used in digital image processing to compress image data prior to transmission from one computer workstation to another computer workstation where the image data is decompressed (i.e., reconstructed). A well-known compression method employs a discrete cosine transform (DCT), such as lossy JPEG (Joint Photographic Expert Group) international standard.

In this regard, a digital representation of an image is divided into a plurality of non-overlapping, contiguous 8×8 blocks of pixel data. Each non-overlapping 8×8 pixel block of image data is then transformed, via the DCT, from a pixel representation space into a DCT representation space. Each transformed block of image data is comprised of one DC coefficient and 63 AC coefficients. The DC coefficient represents the average brightness of the block and the AC coefficients represent the spatial frequency information in the block.

During the coding process, the DC and AC coefficients for each block are quantized and encoded into a bit-stream prior to any transmission to another computer workstation. Quantization, in effect, introduces numerical loss by mapping a range of coefficient values to one value, which mapping is referred to hereinafter as a quantization level. Encoding assigns a binary code to the resulting set of quantized values. At the receiving workstation, the bit-stream is decoded and dequantized to reconstruct the set of dequantized coefficient values. These dequantized coefficients are subsequently transformed back into the pixel representation space via an inverse discrete cosine transform (IDCT), as is well known in the art.

At the compression workstation, the number of bits generated by the compression process corresponds, in part, to the number of quantization levels used in the quantization. Using a fewer number of quantization levels, coarse quantization, will generate a fewer number of bits than a less coarse quantization. However, coarse quantization introduces undesirable blocking artifacts at the decoding workstation. Coarse quantization may increase the disparity between the DC coefficients of neighboring blocks, and it may destroy low frequency AC coefficient information within a block. This results in a blocking artifact which is visually more objectionable in regions of slowly varying intensity.

As used herein, an image region is said to be "busy" if it contains high spatial frequency texture and edge detail. Conversely, an image region is said to be "quiet" if it contains relatively low spatial frequency texture and edge detail as is the case in regions of slowly varying intensity.

A standard technique for reducing blocking artifacts is known as AC prediction, such as that disclosed by Mitchell, J. L. and W. B. Pennebaker "JPEG ENHANCEMENTS" *Still Image Data Compression Standard* 1993, page 261–265, and is applied at the decompression workstation. AC prediction for low frequency AC coefficients is formed using dequantized DC coefficients from the current block and its eight nearest neighbor blocks. The AC predicted coefficient values for the block replace the corresponding dequantized AC coefficient values prior to transforming the image back into the pixel representation space. One shortcoming of this technique is that the AC predicted coefficients replace the dequantized AC coefficient values regardless of the block activity or, in other words, whether the block is in a "busy" area or a "quiet" area. This has the undesirable tendency of visually smoothing out high frequency image detail or "busy" areas in the block, and of introducing low frequency AC information which has no effect in reducing the disparity of dequantized DC coefficients between neighboring blocks.

An adaptive method for reducing blocking artifacts is disclosed in an European Patent Application 0585573A2 by De Garido et. al. An adaptive AC Predictor is based on a prescribed activity measure of the current image block and its eight nearest neighbor blocks. This technique, unlike the above-described method, does not introduce low frequency information via AC prediction in "busy" areas; thus, high spatial frequency and texture information which is indicative of high activity blocks is preserved. This adaptive AC prediction technique still has the disadvantage of not reducing the disparity of the dequantized DC coefficients between neighboring blocks in low activity image areas.

Consequently, a need exists for improvements in the decompression of block-transform coded images so as to overcome the above-described drawbacks.

SUMMARY OF THE INVENTION

The present invention is directed to overcoming one or more of the problems set forth above. Briefly summarized, according to one aspect of the present invention, an improved method for removing blocking artifacts in regions of slowly varying intensity in an electronic image decoded from a transform coded representation of an image, includes the steps of: receiving signals indicative of quantized DC and AC coefficient values of transformed blocks of image data; dequantizing the quantized coefficient values; modifying the DC value in each of the blocks based on the level of activity within the block and the DC values in neighboring blocks; replacing the AC values in each block with the AC predicted values based on the level of activity within the block and the modified DC values in neighboring blocks; and reconstructing the image using the modified DC and AC coefficient values.

It is an object of the present invention to overcome the above-described shortcomings.

It is another object of the present invention to apply the invention without requiring a change to the standard nature of a JPEG compressed bit-stream.

It is a feature of the present invention to provide modifying the DC value in each of the blocks based on the level of activity within the block and the DC values in neighboring blocks.

It is an advantage of the present invention to provide a method which may either be implemented via software or hardware for performing the invention.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
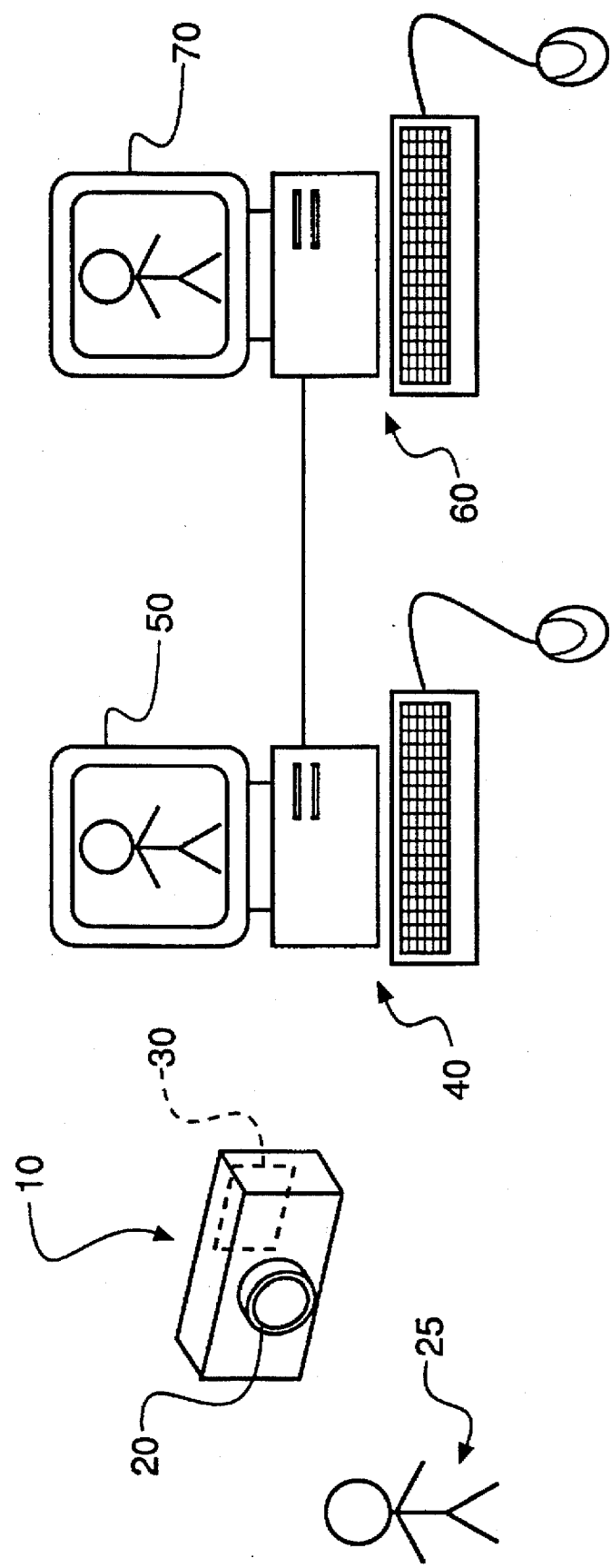
FIG. 1 is a schematic diagram of a computer system for implementing the present invention.

Referring to FIG. 1, there is shown a system for implementing the present invention. A digital camera 10, such as a "KODAK" DC 50, includes a charge-coupled device, CCD (not shown), for receiving incident light through a lens 20, and for converting the incident light into an electronic, digital representation of an image 25 that is contained within the incident light, as is well known in the photographic industry. The CCD transfers the electronic representation of the image to a personal computer card (PCC) 30 for storing the image for later retrieval.

However, before storage of the image on the PCC 30, JPEG compression software which is stored on a memory module (not shown) of the camera 10 is used for compressing the digital representation of the image received from the CCD. Such compression is desirable for limiting the amount of memory necessary for storing the digital representation of the image on the PCC 30.

The PCC 30 is inserted into a local computer or workstation 40 for permitting the representation of the image to be decompressed and viewed on a monitor 50 that is electrically connected to the local computer 40. Alternatively, the digital representation of the image 25, which is still in compressed form, may be transmitted to another remote computer or workstation 60 where it is decompressed for viewing on a monitor 70, printing by a printer (not shown) or further processing by a remote user. For decompressing the digital representation of the image, a software program of the present invention is stored both on the local computer 40 and the remote computer 50 for decompressing the digital representation of the image while also reducing the occurrence of blocking artifacts for permitting such viewing.

Figure 2:
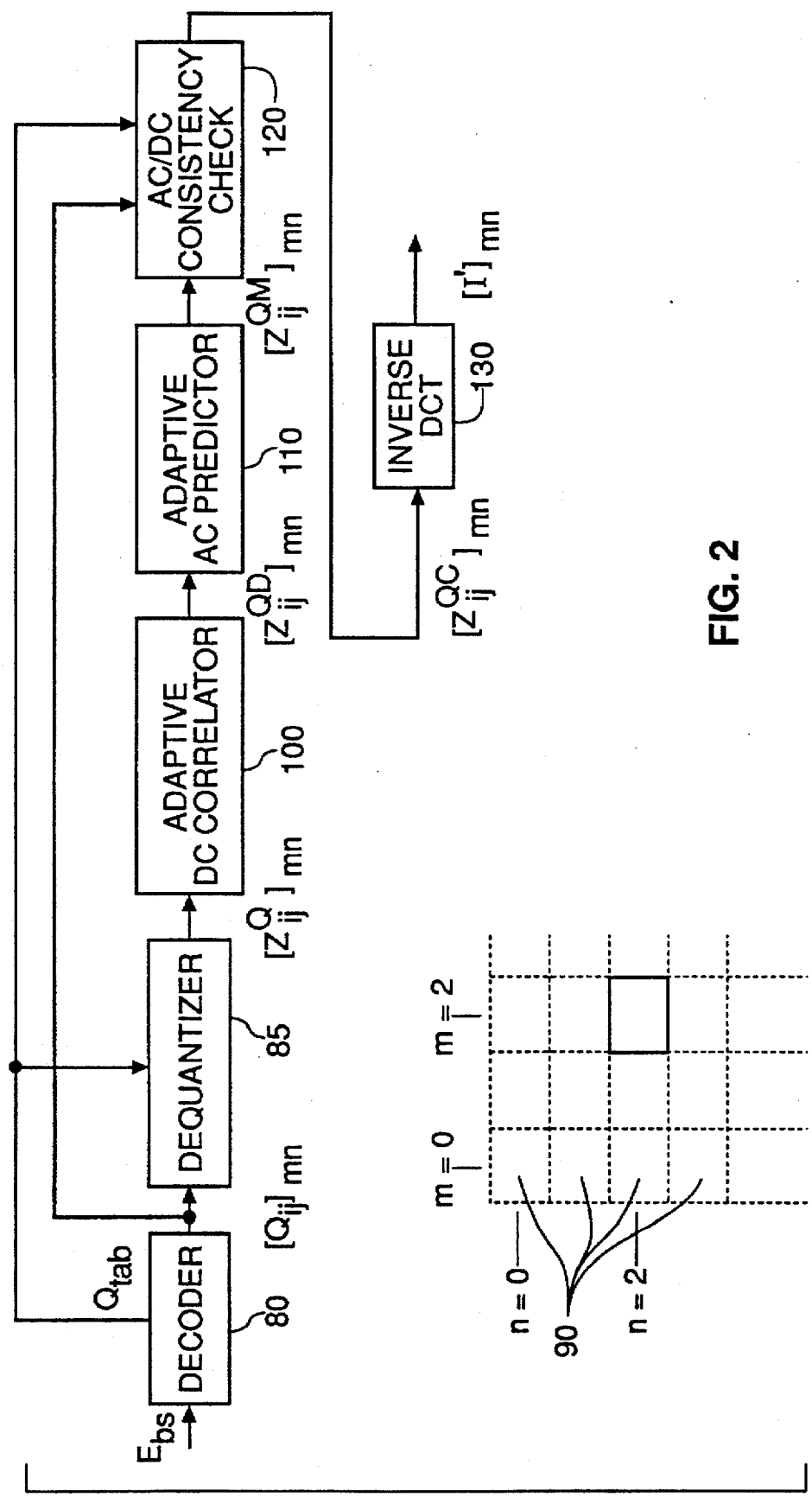
FIG. 2 is a block diagram of the decompression system according to the current invention utilizing an improved block artifact reduction technique.

Referring now to FIG. 2, there is shown a graphical illustration of the software program of the present invention for reducing the occurrence of artifacts in the image when it is reconstructed. It is instructive to note that this software receives the image in a form which has been compressed by lossy JPEG compressor. A standard JPEG-encoded, compressed bit-stream, $E_{br}$, is decoded via a decoder 80 to form signals representative of quantized DC and AC coefficient values of a plurality of transformed blocks of image data, $[Q_{ij}]_{mn}$. The decoder 80 also decodes and produces a quantization table $Q_{tab}$ representing the quantization that was applied at the compressor workstation 60 to the DC and AC coefficient values of each block. The quantized coefficient values, $[Q_{ij}]_{mn}$, are subsequently dequantized using the quantization table, $Q_{tab}$, by a dequantizer 85 to form dequantized coefficient values of a plurality of transformed blocks of image data $[Z_{ij}^Q]_{mn}$.

It facilitates understanding to note that the subscripts i and j index the coefficient values within a block where both i and j take on numerical values ranging from 0 to 7 inclusively. Index values of i=0 and j=0 correspond to the DC coefficient value in the block. Index values of i≠0 or j≠0 correspond to the AC coefficient values in the block. Furthermore, the subscripts m and n denote the horizontal and vertical position of a block 90 from the plurality of blocks respectively. The ij and mn subscript notation herein be used as described to denote coefficient values within the block and locations of the block respectively.

The plurality of dequantized transformed blocks of image data, $[Z_{ij}^Q]_{mn}$, are input to an ADAPTIVE DC CORRELATOR 100 to reduce the disparity between DC coefficients of neighboring blocks. The ADAPTIVE DC CORRELATOR 100, described in detail below, modifies the reconstructed DC coefficient of each block, $[Z_{00}^Q]_{mn}$, based on an activity measure (also described below) of the block and eight nearest neighbor blocks to form transformed blocks of image data with modified DC coefficients, $[Z_{ij}^{QD}]_{mn}$. The modified DC coefficients $[Z_{00}^{QD}]_{mn}$ are used by an ADAPTIVE AC PREDICTOR 110 to form adaptive AC predictions (as is well known in the art) for low frequency AC coefficients in the block. The equations describing the predicted AC coefficient values are:

$$[Z_{01}^{QM}]_{mn} = (1.13885/8)([Z_{00}^{QD}]_{m-1,n} - [Z_{00}^{QD}]_{m+1,n});$$

$$[Z_{10}^{QM}]_{mn} = (1.13885/8)([Z_{00}^{QD}]_{m,n-1} - [Z_{00}^{QD}]_{m,n+1})$$

$$[Z_{20}^{QM}]_{mn} = (0.27881/8)([Z_{00}^{QD}]_{m,n-1} + [Z_{00}^{QD}]_{m,n+1} - 2[Z_{00}^{QD}]_{mn});$$

$$[Z_{11}^{QM}]_{mn} = (1.13885/8)(([Z_{00}^{QD}]_{m-1,n-1} - [Z_{00}^{QD}]_{m+1,n-1}) - ([Z_{00}^{QD}]_{m-1,n+1} - [Z_{00}^{QD}]_{m+1,n+1}));$$

$$[Z_{02}^{QM}]_{mn} = (0.27881/8)([Z_{00}^{QD}]_{m-1,n} + [Z_{00}^{QD}]_{m+1,n} - 2[Z_{00}^{QD}]_{mn}). \quad (1)$$

The output of the ADAPTIVE AC PREDICTOR 110 is transformed blocks of image data with modified DC and AC coefficients, $[Z_{ij}^{QM}]_{mn}$. The modified DC and AC coefficient values in each block $[Z_{ij}^{QM}]_{mn}$ are made consistent by an AC/DC CONSISTENCY CHECK module 120. The AC/DC CONSISTENCY CHECK module 120 with inputs $[Z_{ij}^{QM}]_{mn}$, $[Q_{ij}]_{mn}$ and the quantization table, $Q_{tab}$, produces a consistent set of DC and AC coefficient values which are denoted as $[Z_{ij}^{QC}]_{mn}$. The DC and AC coefficient values in each block $[Z_{ij}^{QM}]_{mn}$ are consistent if, when quantized by the corresponding $Q_{tab}$ entry, they result in quantized DC and AC coefficient values which are the same as those in $[Q_{ij}]_{mn}$. If $[Z_{ij}^{QM}]_{mn}$ is not consistent, the AC/DC CONSISTENCY CHECK module 120 increases or decreases the appropriate coefficient values in each block $[Z_{ij}^{QM}]_{mn}$ until the corresponding DC and AC coefficient values are made consistent. This method of consistency checking introduces the smallest magnitude change of the coefficient values. The consistent blocks of DCT representative data, $[Z_{ij}^{QC}]_{mn}$, are then transformed back into a pixel representation space by a well-known INVERSE DCT module 130 to form blocks of reconstructed image data, $[I']_{mn}$.

Figure 3:
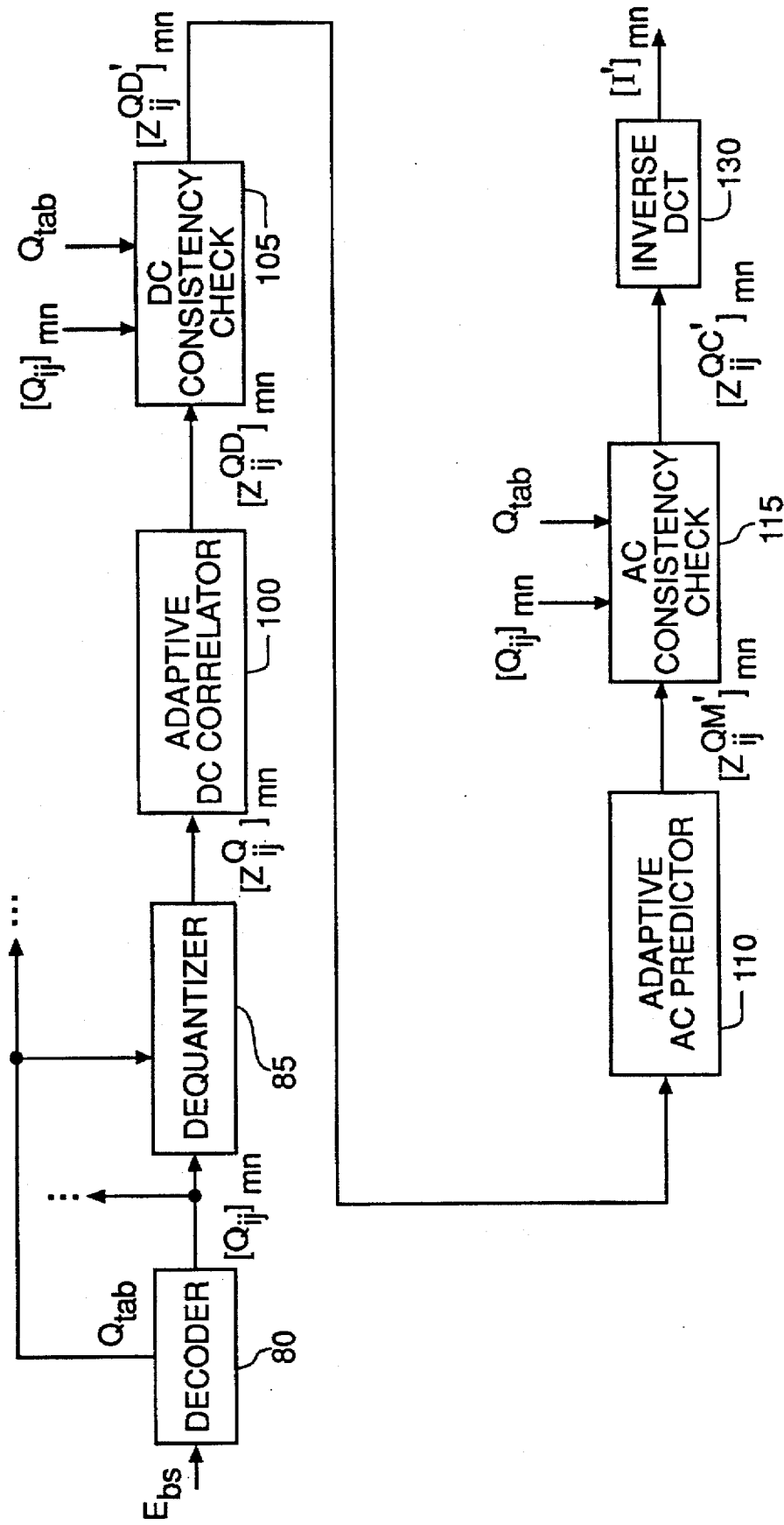
FIG. 3 is a block diagram of an alternative decompression system according to the present invention utilizing an improved block artifact reduction technique.

An alternate preferred embodiment of the present invention is shown in FIG. 3. The modules in FIG. 3 which are equivalently numbered to those modules in FIG. 2 are functionally identical. The embodiment in FIG. 3 is comprised of an additional DC CONSISTENCY CHECK module 105, and an AC CONSISTENCY CHECK module 115, but does not include the combined AC/DC CONSISTENCY CHECK module 120 (shown in FIG. 2). The DC CONSISTENCY CHECK module 105 takes inputs $[Z_{ij}^{QD}]_{mn}$, $[Q_{ij}]_{mn}$, and $Q_{tab}$ and makes $[Z_{00}^{QD}]_{mn}$ consistent with $[Q_{00}]_{mn}$ in the same manner described for the AC/DC CONSISTENCY CHECK module 120 (shown in FIG. 2) to produce $[Z_{ij}^{QD}]_{mn}$. The AC CONSISTENCY CHECK module 115 takes inputs $[Z_{ij}^{QM}]_{mn}$, $[Q_{ij}]_{mn}$, and $Q_{zab}$, and makes the AC coefficients (i.e., i≠0 or j≠0) consistent with $[Q_{ij}]_{mn}$ in the same manner described for the AC/DC CONSISTENCY CHECK module 120 (shown in FIG. 2) to produce $[Z_{ij}^{QC}]_{mn}$.

As is well known in the art, the reconstructed image data may be used by any suitable computing station, such as workstations 40 or 60, to transform the image data into a hardcopy image that has reduced blocking artifacts, particularly in regions of slowly varying intensity.

Figure 4:
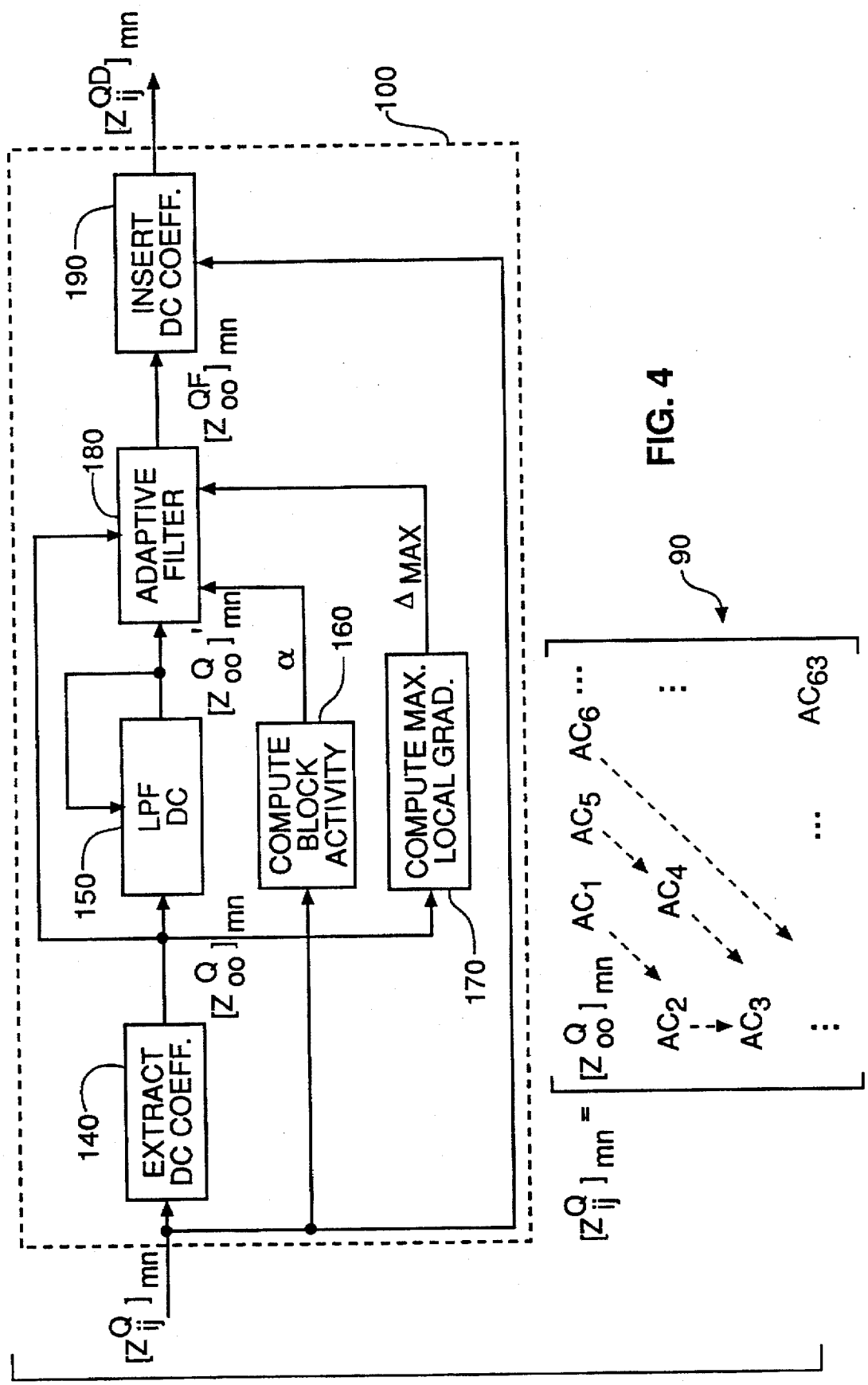
FIG. 4 is a detailed block diagram of the method used to modify the DC coefficients.

A detailed block diagram of the ADAPTIVE DC CORRELATOR 100 is shown in FIG. 4. Dequantized transformed blocks of image data, $[Z_{ij}^{Q}]_{mn}$, are passed to the EXTRACT DC COEFFICIENT module 140 which extracts the DC coefficient from each block which is denoted as $[Z_{00}^{Q}]_{mn}$. The DC low pass filter (LPF) module 150 generates a low pass filtered version of the $[Z_{00}^{Q}]_{mn}$, denoted as $[Z_{00}^{Q}]'_{mn}$, by convolving $[Z_{00}^{Q}]_{mn}$ with a low pass filter denoted as [B].

$$[Z_{00}^Q]'\,mn = \sum_{q=-1}^{1}\sum_{p=-1}^{1}([Z_{00}^Q]_{m+p,n+q})B_{pq}. \quad (2)$$

In the preferred embodiment the low pass filter 150, [B], is a 3×3 element matrix with the following coefficients:

$$[B] = \begin{matrix} 1/16 & 1/16 & 1/16 \\ 1/16 & 8/16 & 1/16 \\ 1/16 & 1/16 & 1/16 \end{matrix} ; p=-1,0,1 \text{ and } q=-1,0,1. \quad (3)$$

The elements of [B] are referenced as $B_{pq}$ with subscripts p and q corresponding to the horizontal and vertical location of the matrix elements with top left element being identified with p=−1 and q=−1.

An alternate embodiment of the low pass filtering operation denoted by equation (2) is given by equation (4).

$$[Z_{00}^Q]'\,mn = \left[\sum_{p=-1}^{1}([Z_{00}^Q]'\,m+p,n-1)B_{p,-1}\right] + ([Z_{00}^Q]'\,m-1,n)B_{-1,0} + \left[\sum_{q=0}^{1}\sum_{p=0}^{1}([Z_{00}^Q]_{m+p,n+q})B_{pq}\right] + ([Z_{00}^Q]_{m-1,n+1})B_{-1,1}.$$

This alternative filtering process uses previously filtered coefficient values for modifying the current coefficient value.

A COMPUTE BLOCK ACTIVITY module 160 determines the activity for each dequantized transformed block of image data $[Z_{ij}^{Q}]_{mn}$. The output of this module 160 is an activity indicator, α, which takes on values greater than or equal to 0.0 and less than 1.0. Each block $[Z_{ij}^{Q}]_{mn}$ is comprised of one DC coefficient (for i=0 and j=0) value and 63 AC coefficient values (for i≠0 or j≠0). The nomenclature illustrated in block 90 is an alternate representation of $[Z_{ij}^{Q}]_{mn}$ illustrating the diagonal zig-zag ordering as defined by the JPEG international standard; the index k represents the AC coefficient's index. Each $AC_k$ coefficient value in a block is examined and determined if the coefficient takes on a zero or a non-zero value. Each index of k with a non-zero coefficient value is stored in memory (not shown). The stored indices are retrieved from memory and the maximum index value k is determined and is denoted as $k_{nz}$. The activity measure α is calculated by taking the ratio of $k_{nz}$ and the numerical value 64.

$$\alpha = k_{nz}/64 \quad (5)$$

The numerical value 64 in the denominator of equation (5) corresponds to the total number of DC and AC coefficient values in a block. The $k_{nz}$ value may also be obtained by reading the end of block (EOB) indicator from the decoder as defined in the JPEG standard, as is known by those skilled in the art. There are also other techniques known in the art that may be used to compute the activity of a transformed block of image data as will be readily apparent by those skilled in the art.

In conjunction with the computing of the activity of a block 90, a maximum local gradient is computed between the DC coefficient of a block 90 and the DC coefficient from its eight nearest neighbors by the COMPUTE MAXIMUM LOCAL GRAD module 170. This module 170 determines the maximum absolute value difference between the DC value of the current block and the DC values of the eight nearest neighbor blocks as denoted by $\Delta_{max}$.

$$\Delta_{max} = MAX(|[Z_{00}^Q]_{m+u,n+v} - [Z_{00}^Q]_{mn}|) \quad (6)$$

For all integer values of u and v such that, $$-1 \leq u \leq 1, \text{ and } -1 \leq v \leq 1.$$

The original dequantized DC values $[Z_{00}^Q]_{mn}$, low pass filtered DC values $[Z_{00}^Q]'mn$, the activity measure α, and the maximum local gradient $\Delta_{max}$ are inputs to an ADAPTIVE FILTER module 180 to generate an adaptively filtered DC coefficient, $[Z_{00}^{QF}]_{mn}$. The ADAPTIVE FILTER module 180 adaptively combines the $[Z_{00}^Q]_{mn}$ and $[Z_{00}^Q]'mn$ coefficients to produce $[Z_{00}^{QF}]_{mn}$ according to the following logic:

If $(\Delta_{max} < \Delta_{Thresh})$ $$[Z_{00}^{QF}]_{mn} = \alpha[Z_{00}^Q]_{mn} + (1-\alpha)[Z_{00}^Q]'mn$$

Else $$[Z_{00}^{QF}]_{mn} = [Z_{00}^Q]_{mn}.$$

Where $\Delta_{Thresh}$ is a user defined value and is preferably set to 256 for pixel representative data which has a binary representation of 8 bits per pixel for the JPEG baseline. According to the above logic, the low pass filtered DC coefficient $[Z_{00}^Q]'mn$ is combined with the original dequantized DC coefficient $[Z_{00}^Q]_{mn}$ only if $\Delta_{max}$ is less than $\Delta_{Thresh}$. This is a switching mechanism which allows the adaptive filtering to be invoked in image regions for slowly varying intensity. The adaptively filtered DC coefficient $[Z_{00}^{QF}]_{00\,mn}$ replaces $[Z_{00}^Q]_{mn}$ by the INSERT DC COEFFICIENT module 190 to produce a block of quantized transform representative data with a modified DC coefficient, $[Z_{ij}^{QD}]_{mn}$.

As shown in FIG. 2, $[Z_{ij}^{QD}]_{mn}$ is an input to the ADAPTIVE AC PREDICTOR module 110 as previously described; and as shown in FIG. 3, $[Z_{ij}^{QD}]_{mn}$ is an input to the DC CONSISTENCY CHECK module 105.

The invention has been described with reference to a preferred embodiment. However, it will be appreciated that variations and modifications can be effected by a person of ordinary skill in the art without departing from the scope of the invention. Examples of such changes include and are not limited to the use of different activity measures, surgically eliminating pre-identified function modules so as to reduce the computational complexity, limiting the number states that α may take on, choosing other user defined values for $\Delta_{Thresh}$, and performing threshold comparisons first and skipping block 100 if need be.

Parts List 10 camera
20 lens 25 image
30 personal computer card (PCC)
40 workstation
50 monitor
60 workstation
70 monitor
80 decoder
90 block
100 adaptive DC correlator
110 adaptive AC predictor module
120 consistency check module
130 inverse DCT module
140 extract DC coefficient
150 low pass filter
160 compute block activity
170 compute maximum local grad module
180 adaptive filter module
190 insert DC coefficient module

What is claimed is:

1. An improved method for removing blocking artifacts in regions of slowly varying intensity in an electronic image decoded from a transform-coded representation of an image, the method comprising the steps of:
   (a) receiving signals indicative of DC and AC coefficient values of transformed blocks of image data;
   (b) dequantizing the quantized coefficient values;
   (c) modifying the DC value in each of the blocks based on the level of activity within the block and the DC values in neighboring blocks;
   (d) replacing the AC values in each block with the AC predicted values based on the modified DC values in the block and in neighboring blocks; and
   (e) reconstructing the image using the modified DC and AC coefficient values.

2. The method as in claim 1, wherein step (c) further comprises computing the activity level by identifying a highest AC coefficient index that represents a non-zero frequency component in the block.

3. The method as in claim 1, wherein step (c) further comprises computing the activity level by calculating a maximum absolute value difference between the DC value of a block and its eight nearest neighbors for forming a local gradient.

4. The method as in claim 1, wherein step (c) further comprises modifying the DC value by convolving a low pass filter with the DC coefficients derived from the received transformed blocks of image data and replacing the DC coefficient derived from the received transformed blocks of image data with the convolved DC coefficient if a predetermined criterion is met.

5. The method as in claim 4, wherein the predetermined criterion includes determining when the local gradient is less than a threshold.

6. The method as in claim 1 further comprising performing adaptive AC prediction on the result of step (d).

7. The method as in claim 1 further comprising performing a consistency check of the results of the modified DC values and AC predicted values.

8. A computer for receiving signals indicative of DC and AC coefficient values of transformed blocks of image data and for removing artifacts of slowly varying intensity from the image data, the computer comprising:
   (a) means for dequantizing coefficient values;
   (b) means for modifying the DC value in each of the blocks based on the level of activity within the block and the DC values in neighboring blocks; and
   (c) means for replacing the AC values in each block with the AC predicted values based on the level of activity within the block and the modified DC values in neighboring blocks.

9. The computer as in claim 8 further comprising means for computing the activity level by identifying a highest AC coefficient index that represents a non-zero frequency component in the block.

10. The computer as in claim 8 further comprising means for computing the activity level by calculating a maximum absolute value difference between the DC value of a block and its eight nearest neighbors for forming a local gradient.

11. The computer as in claim 10 further comprising means for modifying the DC value by convolving a low pass filter with the DC coefficients derived from the received transformed blocks of image data and replacing the DC coefficient derived from the received transformed blocks of image data with the convolved DC coefficient if a predetermined criterion is met.

12. The computer as in claim 11, further comprising means for determining when the local gradient is less than a threshold.

13. A computer program product comprising:
   a computer readable storage medium having a computer program stored thereon for performing the steps of:
   (a) receiving signals indicative of DC and AC coefficient values of transformed blocks of image data;
   (b) modifying the DC value in each of the blocks based on the level of activity within the block and the DC values in neighboring blocks;
   (c) replacing the AC values in each block with the AC predicted values based on the level of activity within the block and the modified DC values in neighboring blocks; and
   (d) reconstructing the image using the modified DC and AC coefficient values.

14. The computer program product as in claim 13 further comprising the step of computing the activity level by identifying a highest AC coefficient index that represents a non-zero frequency component in the block.

15. The computer program product as in claim 14 further comprising the step of computing the activity level by calculating a maximum absolute value difference between the DC value of a block and its eight nearest neighbors for forming a local gradient.

16. The computer program product as in claim 15 further comprising the step of modifying the DC value by convolving a low pass filter with the DC coefficient derived from the received transformed blocks of image data and replacing the DC coefficient derived from the received transformed blocks of image data with the convolved DC coefficient if a predetermined criterion is met.

17. The computer program product as in claim 16 further comprising the step of determining when the local gradient is less than a threshold.

18. The computer program product as in claim 13 further comprising the step of performing adaptive AC prediction on the results of step (c).

19. The computer program product as in claim 13 further comprising the step of performing a consistency check on the results of the modified DC values and AC predicted values.

20. An improved method for removing blocking artifacts in regions of slowly varying intensity in an electronic image decoded from a transform-coded representation of an image, the method comprising the steps of:

(a) receiving signals indicative of DC and AC coefficient values of transformed blocks of image data;

(b) modifying the DC value in each of the blocks; and (c) reconstructing the image using the modified DC and AC coefficient values.

21. The method as in claim 20, wherein step (b) further includes modifying the DC value in each of the blocks based on the level of activity within the block and the DC values in neighboring blocks.

22. The method as in claim 21 further comprising replacing the AC values in each block with the AC predicted values based on the level of activity within the block and the modified DC values in neighboring blocks.

23. The method as in claim 20, wherein step (b) further comprises computing the activity level by identifying a highest AC coefficient index that represents a non-zero frequency component in the block.

24. The method as in claim 20, wherein step (b) further comprises computing the activity level by calculating a maximum absolute value difference between the DC value of a block and its eight nearest neighbors for forming a local gradient.

25. The method as in claim 20, wherein step (b) further comprises modifying the DC value by convolving a low pass filter with the DC coefficients derived from the received transformed blocks of image data and replacing the DC coefficient derived from the received transformed blocks of image data with the convolved DC coefficient if a predetermined criterion is met.

26. The method as in claim 25, wherein the predetermined criterion includes determining when the local gradient is less than a threshold.

27. The method as in claim 20 further comprising performing adaptive AC prediction on the result of step (c).

28. The method as in claim 20 further comprising performing a consistency check of the results of the modified DC values and AC predicted values.

29. A method for verifying the results of adaptive DC correlation, the method comprising:

(a) receiving a signal representative of a DC coefficient of adaptive DC correlation; and (b) determining whether the DC coefficient is consistent with a previous computed value from which the DC coefficient is derived.

30. The method as in claim 29 further comprising modifying the DC coefficient based on whether the DC coefficient is consistent.

31. The method as in claim 29 further comprising receiving a signal representative of an AC coefficient of adaptive AC correlation; and determining whether the AC coefficient is consistent with a previous computed value from which the AC coefficient is derived.

32. The method as in claim 31 further comprising modifying the AC coefficient based on whether the AC coefficient is consistent.

* * * * *